US006901817B2

(12) United States Patent
Koga et al.

(10) Patent No.: US 6,901,817 B2
(45) Date of Patent: Jun. 7, 2005

(54) NEUTRAL POINT VOLTAGE REGULATOR OF TORQUE SENSOR

(75) Inventors: Shinsuke Koga, Tochigi (JP); Takayuki Ueno, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/802,214

(22) Filed: Mar. 17, 2004

(65) Prior Publication Data

US 2005/0005714 A1 Jan. 13, 2005

(30) Foreign Application Priority Data

Jul. 10, 2003 (JP) ........................................ 2003-272670

(51) Int. Cl.$^7$ ................................................ G01L 3/02
(52) U.S. Cl. ................................................ 73/862.331
(58) Field of Search .............................. 73/862, 862.08, 73/862.331, 862.333

(56) References Cited

U.S. PATENT DOCUMENTS

| 5,412,998 | A | * | 5/1995 | Nakamoto et al. | ..... | 73/862.335 |
|---|---|---|---|---|---|---|
| 6,591,699 | B2 | * | 7/2003 | Ueno | .................... | 73/862.331 |
| 6,622,576 | B1 | * | 9/2003 | Nakano et al. | ........ | 73/862.331 |
| 2003/0029251 | A1 | * | 2/2003 | Ueno | .................... | 73/862.331 |
| 2004/0112147 | A1 | * | 6/2004 | Mir et al. | .............. | 73/862.331 |
| 2004/0144183 | A1 | * | 7/2004 | Ueno et al. | ............ | 73/862.331 |

OTHER PUBLICATIONS

Japanese Patent Application Laid–Open No. 2003–50167.

* cited by examiner

Primary Examiner—Edward Lefkowitz
Assistant Examiner—T Miller
(74) Attorney, Agent, or Firm—Orum & Roth

(57) ABSTRACT

A neutral point voltage regulator of a torque sensor which has a pair of coils having inductances changing in opposite directions based on torques, and torque detecting means for outputting a torque detecting voltage Vt based on a voltage difference between a first voltage and a second voltage based on respective inductance changes of the pair of coils. The neutral point voltage regulator has an ideal temperature-characteristic storing means for storing a temperature characteristic of the torque detecting voltage Vt in neutral condition which is ideal temperature characteristic of which a reference neutral point voltage Vo corresponds to a reference temperature, temperature detecting means for detecting a temperature of the torque sensor, regulating voltage calculating means for calculating a neutral point regulating voltage $\Delta$Vo based on a measured torque detecting voltage Vp of the torque detecting means measured in neutral condition after assembly of the torque sensor, a detected temperature Tp detected by the temperature detecting means when measuring the torque detecting voltage, and the ideal temperature characteristic stored by the ideal temperature-characteristic storing means, and voltage regulating means for regulating the torque detecting voltage Vt of the torque detecting means based on the neutral point regulating voltage $\Delta$Vo calculated by the regulating voltage calculating means.

3 Claims, 5 Drawing Sheets

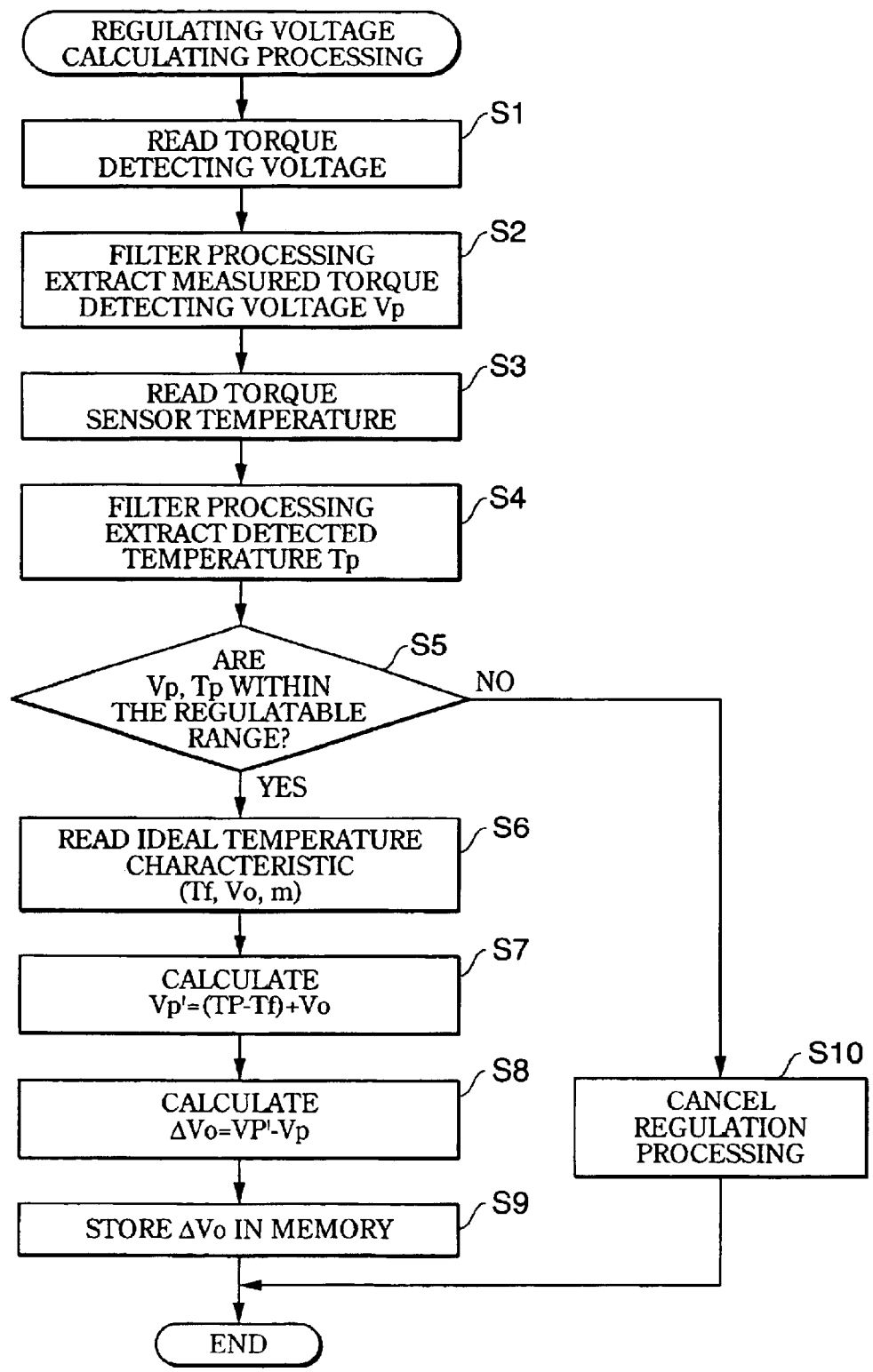

NEUTRAL POINT VOLTAGE REGULATOR OF TORQUE SENSOR

This application claims priority of Application No. 2003-272670 filed on 10 Jul. 2003 filed with the Japanese Patent and Trademark Office.

BACKGROUND OF THE INVENTION

1. Field of the Invention

The present invention relates to a neutral point voltage regulator for regulating a voltage in neutral condition in a torque sensor which detects a torque on the basis of inductance changes of a pair of coils having inductances changing in opposite directions.

2. Description of the Related Art

Torque sensors performs torque detection based on a torque detecting voltage which is a voltage difference between a first voltage and a second voltage on the basis of respective inductance changes of a pair of coils having inductances changing in opposite directions corresponding to torque.

Coils have temperature sensitive characteristics, and thermal expansion of a component of the torque sensor, or its entire housing or the like, may cause a change in the temperature, which affects a torque detection output and prevents accurate torque detection.

The present applicant proposes a temperature compensator for correcting a torque detecting voltage as described above based on a detected temperature of a detecting circuit. The circuit is provided for detecting a temperature from a voltage obtained by adding a first temperature detecting voltage and a second temperature detecting voltage on the basis of inductance changes of a pair of coils as referred to Japanese Patent Application Laid-open No.2003-050167.

The above-mentioned publication discloses correcting of a torque detecting voltage based on a detected temperature on the precondition that a reference neutral point voltage of the torque detecting voltage at neutral condition is a predetermined constant voltage. However, in fact, the neutral point voltage is not necessarily predetermined due to variations of parts or their assembly or the like.

Accordingly, it is necessary, after assembling a torque sensor, to measure a torque detecting voltage in neutral condition and compensate for a voltage difference from a reference neutral point voltage. Since a change in temperature makes a torque detecting voltage vary, it is required to set a reference neutral point voltage at a reference temperature, perform assembly of parts in a workplace while keeping the reference temperature, measure a torque detecting voltage in neutral condition still at the reference temperature after assembly and obtain a voltage difference from the reference neutral point voltage as a regulating voltage.

If a temperature is wrongly set, an accurate regulating voltage can not be obtained. Then, temperature control at a workplace has to be made with great thoroughness, which makes it difficult to assemble a torque sensor conveniently and measure a torque detecting voltage to obtain a regulating voltage.

SUMMARY OF THE INVENTION

The present invention has been achieved in view of the foregoing. An object of the present invention is to provide a temperature compensator of a torque sensor which enables the torque sensor to be integrated into a torque sensor conveniently while eliminating the need to control the temperature of an assembly workplace, and measure a torque detecting voltage so as to obtain a regulating voltage for compensating for mechanical variations.

According to the present invention, a neutral point voltage regulator of a torque sensor has a pair of coils having inductances changing in opposite directions based on torques and torque detecting means for outputting a torque detecting voltage based on a voltage difference between a first voltage and a second voltage based on respective inductance changes of the pair of coils. The neutral point voltage regulator comprises ideal temperature-characteristic storing means for storing a temperature characteristic of the torque detecting voltage in neutral condition. This is an ideal temperature characteristic of which a reference neutral point voltage corresponds to a reference temperature, temperature detecting means for detecting a temperature of the torque sensor, regulating voltage calculating means for calculating a neutral point regulating voltage based on a measured torque detecting voltage of the torque detecting means measured in neutral condition after assembly of the torque sensor, a detected temperature detected by the temperature detecting means when measuring the torque detecting voltage and the ideal temperature characteristic stored by the ideal temperature-characteristic storing means. Voltage regulating means is provided for regulating the torque detecting voltage of the torque detecting means based on the neutral point regulating voltage calculated by the regulating voltage calculating means.

BRIEF DESCRIPTION OF THE DRAWINGS

The present invention will be more fully understood from the detailed description given below and from the accompanying drawings which should not be taken to be a limitation on the invention, but are for explanation and understanding only.

FIG. 6 is a flowchart showing the procedure of regulating voltage calculating processing of a neutral point voltage.

DESCRIPTION OF THE PREFERRED EMBODIMENTS

One embodiment of the present invention is described below with reference to FIG. 1 to FIG. 6.

Figure 1:
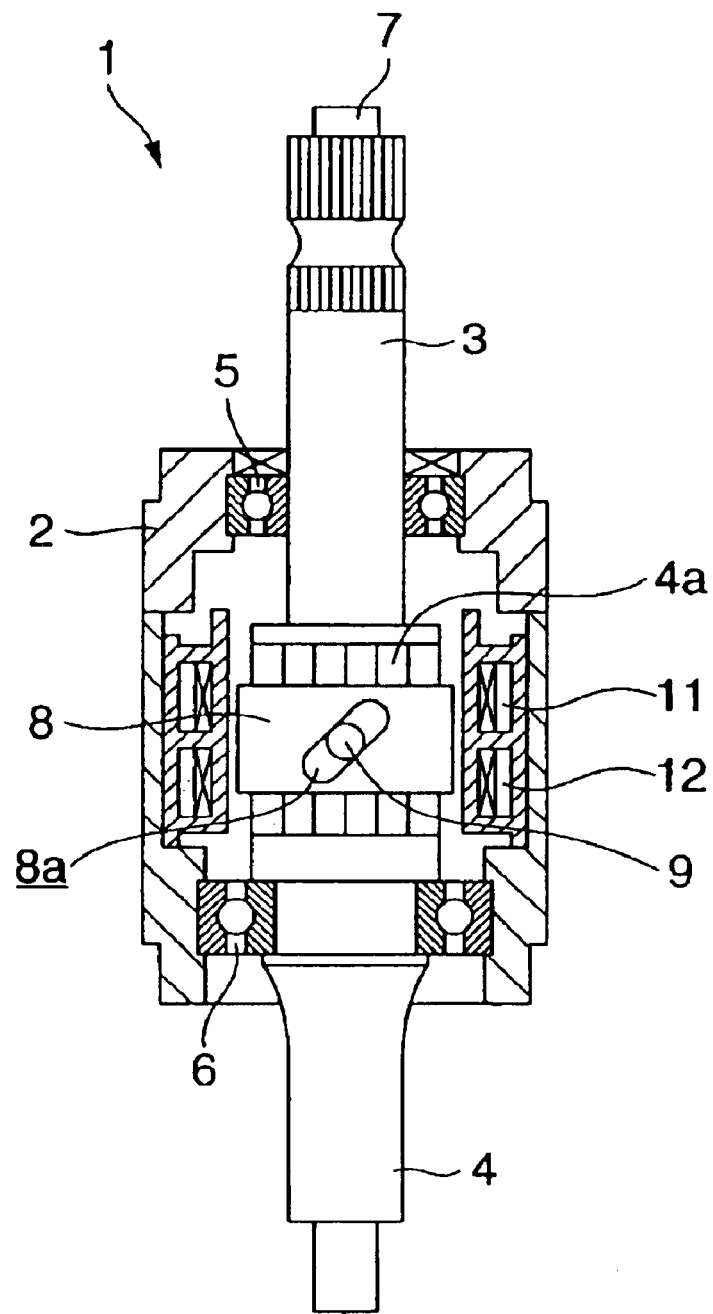
FIG. 1 is a view schematically showing a construction of mechanical parts of a torque sensor according to one embodiment of the present invention.

A torque sensor 1 of this embodiment is applied to a power steering system for a vehicle, and FIG. 1 schematically shows a structure of the torque sensor 1.

An input shaft 3 and an output shaft 4 are rotatably supported via bearings 5 and 6, are coaxially inserted into a housing 2, and are connected by a torsion bar 7 therein.

A cylindrical core 8 is fitted onto a serrated outer peripheral surface of a large-diameter end portion 4a of the output shaft 4, and is provided so as to be slidable in only an axial direction with respect to the output shaft 4. A slider pin 9 projected from the input shaft 3 is fitted into a spiral groove 8a of the core 8 in a circumferential direction of the large-diameter end portion 4a through a long slot.

Two torque detecting coils 11 and 12 supported in the housing 2 are provided at an outer periphery of the cylindrical core 8 and are slidable along an axial direction via a space.

These two coils 11 and 12 are arranged at a side opposite each other with respect to the center of the axial direction of the slidable core 8.

When a torsional stress acts on the input shaft 3, a rotating force is transmitted to the output shaft 4 via the torsion bar 7, and then, the torsion bar 7 is elastically deformed. As a result, a relative displacement of a rotating direction is generated between the input shaft 3 and the output shaft 4.

The relative displacement of the rotating direction slides the core 8 to the axial direction by an engagement of the slider pin 9 and the spiral groove 8a.

When the core 8 is moved to the axial direction, each area of the coils 11 and 12 surrounding the core 8 varies, and there is a relation such that when an area of one coil surrounding the core 8 increases, an area of the other coil surrounding the core 8 decreases.

When the area surrounding the core 8 increases, a magnetic loss increases; therefore, inductance of the coil decreases. Conversely, when the area surrounding the core 8 decreases, a magnetic loss decreases; therefore, inductance of the coil increases.

Accordingly, in the case where a torque of moving the core 8 to the coil 11 side acts, an inductance L1 of the coil 11 decreases, and an inductance L2 of the coil 12 increases. Conversely, in the case where a torque of moving the core 8 to the coil 12 side acts, an inductance L1 of the coil 11 increases, and an inductance L2 of the coil 12 decreases.

Figure 2:
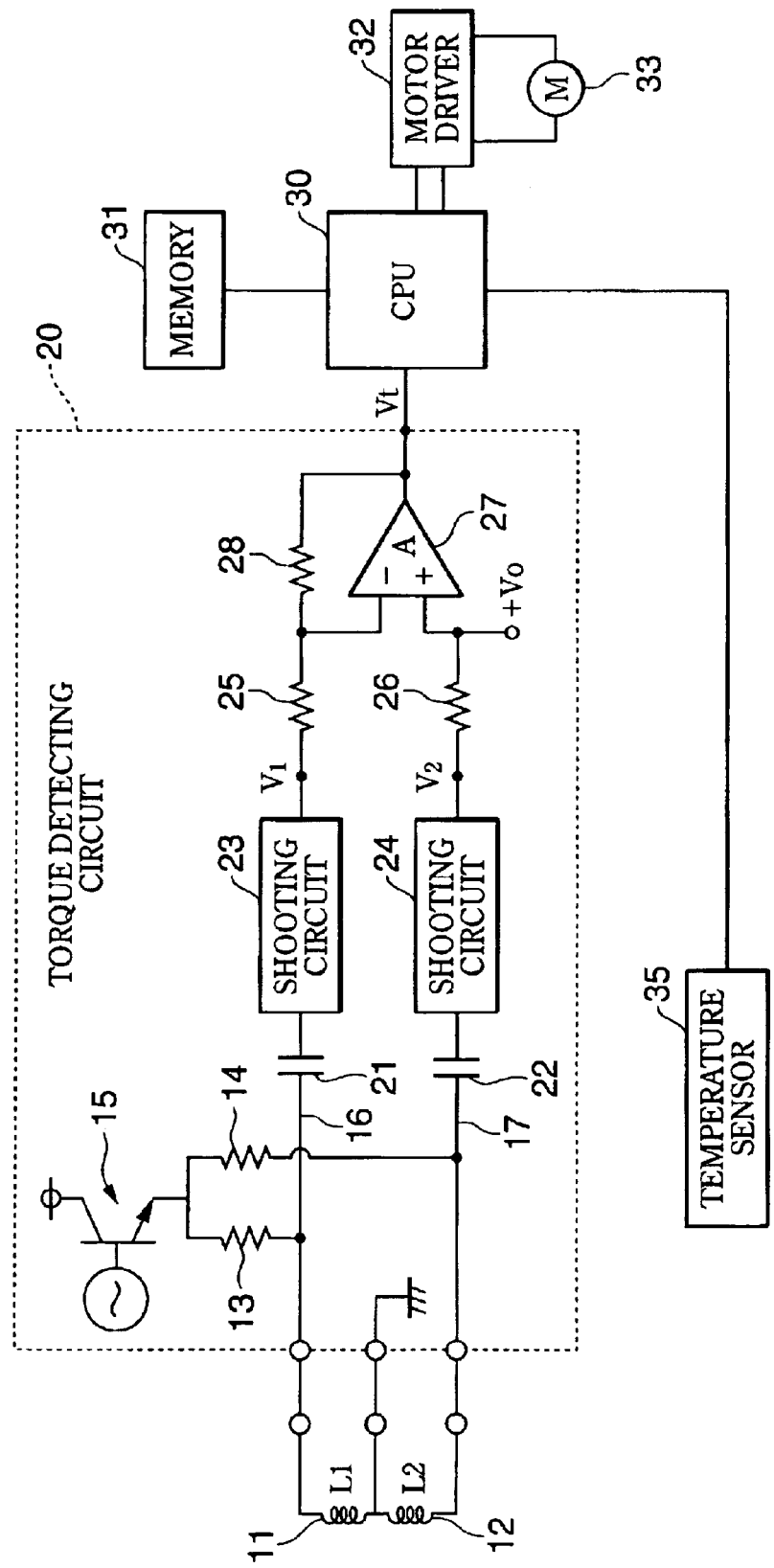
FIG. 2 is a schematic structure diagram of an electric circuit of the same torque sensor.

FIG. 2 shows a schematic structure diagram of an electric circuit for detecting a torque based on changes in inductance L1, L2 of coils 11, 12 in this torque sensor 1.

The coils 11, 12 are connected through each end, and signal lines from that connection terminal and the other ends are extended and connected to connecting terminals of a torque detecting circuit 20 disposed in an electric control unit ECU.

In the torque detecting circuit 20, the connecting terminal between the coils 11 and 12 is grounded while the other ends are connected to an emitter terminal of a transistor 15 through resistors 13, 14.

In the transistor 15, a constant voltage is applied to its collector terminal while AC voltage is inputted to its base terminal.

A voltage signal line 16 extended from a connecting portion between the coil 11 and the resistor 13 is connected to a smoothing circuit 23 through a capacitor 21. A voltage signal line 17 extended from a connecting point between the coil 12 and the resistor 14 is connected to a smoothing circuit 24 through a capacitor 22.

A bridge circuit is comprised of the coils 11, 12 and the resistors 13, 14, and an oscillation voltage is inputted to that bridge circuit. Output voltages from that circuit are inputted to the smoothing circuits 23, 24 and smoothed and outputted as first and second voltages $V_1$, $V_2$.

The first and second voltages $V_1$, $V_2$ are inputted to an inversion input terminal and a non-inversion input terminal of a differential amplifier 27, which is an operational amplifier, through the resistors 25, 26.

Negative feedback is applied to the differential amplifier 27 by the resistor 28 so that it functions as a differential amplifier. Its output is inputted to CPU 30 as a torque detection voltage Vt.

Bias voltage $V_0$ is inputted to the non-inversion input terminal of the differential amplifier 27.

Therefore, the differential amplifier 27 amplifies a difference between the first voltage $V_1$ and the second voltage $V_2$ by A times, and outputs this plus the bias voltage $V_0$ as torque detection voltage Vt.

That is, the torque detection voltage Vt is $Vt=(V_2-V_1)A+V_0$.

A torque detection voltage Vt during neutral time which is not deflected to either right steering torque (torsion torque in the right direction), or left steering torque (torsion torque in the left direction) is called neutral point voltage and the aforementioned bias voltage $V_0$ at the normal time is the neutral point voltage.

This torque sensor 1 has the above-described schematic circuit structure. The operation thereof will be described with reference to FIGS. 3A and 3B showing behaviors of the first and second voltages $V_1$, $V_2$ and the torque detection voltage Vt.

Figure 3A:
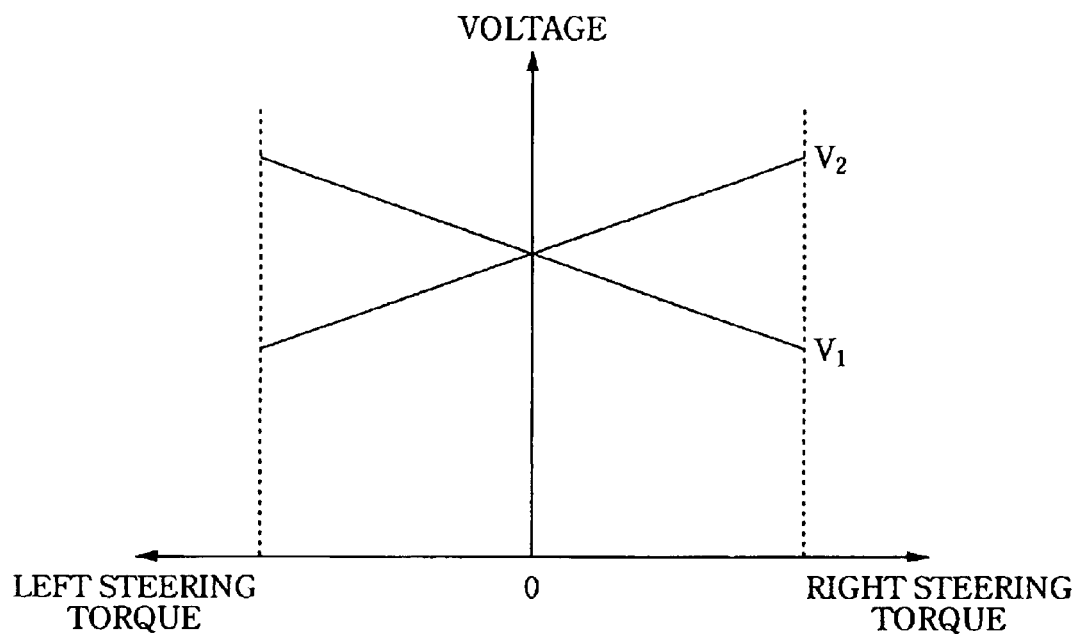
FIGS. 3A and 3B are diagrams showing first and second voltages and torque detecting voltages at normal time.
Figure 3B:
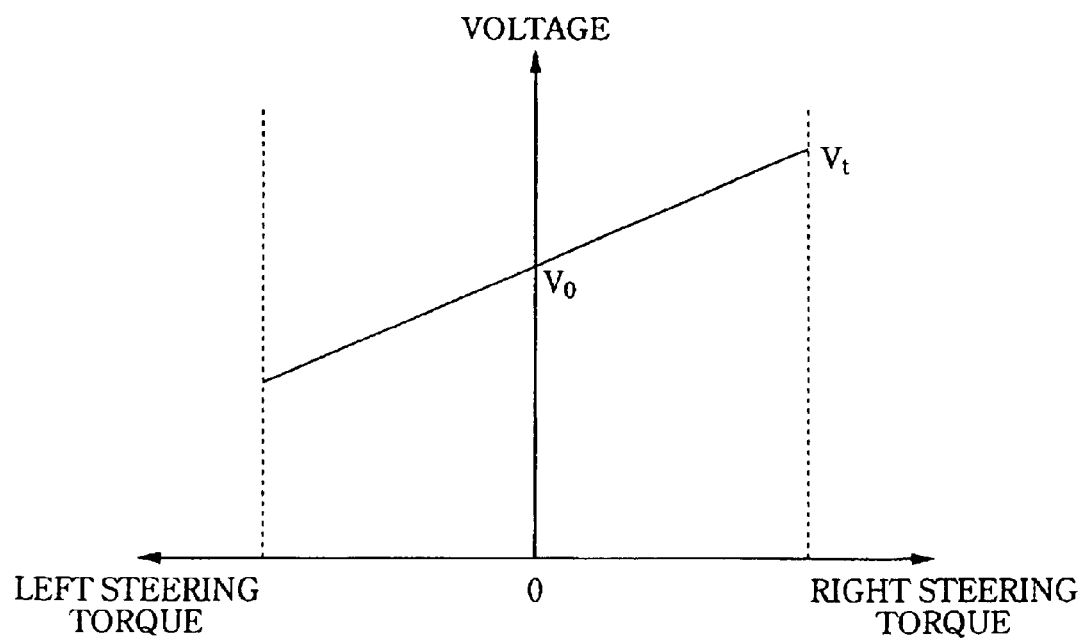

In coordinates shown in FIGS. 3A and 3B, its ordinate axis indicates voltage, rightward in the abscissa axis indicates right steering torque and leftward therein indicates left steering torque, while home position 0 indicates the neutral point.

FIGS. 3A and 3B show a condition in which the torque sensor 1 operates normally with no error caused by variations of parts or their assembly. When the right steering torque is increased, a core 8 moves toward the coil 11 due to a relative rotation between the input shaft 3 and the output shaft 4. Consequently, the inductance L2 of the coil 12 is increased so as to increase its induced electromotive force, and conversely the inductance L1 of the coil 11 is decreased so as to decrease induced electromotive force. As a result, the second voltage $V_2$ is increased while the first voltage $V_1$ is decreased (see FIG. 3A).

If the left steering torque is increased, conversely, the second voltage $V_2$ is decreased while the first voltage $V_1$ is increased (see FIG. 3A).

The torque detection voltage Vt, which is an output of the differential amplifier 27 gained by multiplying the difference between both by A times and then adding the bias voltage, is a rightward rising inclined line which passes the bias voltage $V_0$ at the neutral point shown in FIG. 3B.

The right and left steering torque can be detected according to the inclined line of the torque detection voltage Vt shown in FIG. 3B.

The CPU 30 outputs a motor control instruction signal to a motor driver 32 based on the torque detection voltage Vt, so that a motor 33 which assists steering is driven by the motor driver 32.

In this manner, assistance of the motor 33 depending on the steering torque is obtained in the steering operation.

In the power steering control mechanism described above, influence upon the torque sensor 1 by temperature cannot be avoided.

Because the torque detection voltage Vt is obtained based on the difference between the first voltage $V_1$ and the second voltage $V_2$, changes in temperature of the respective coils 11, 12 are offset by each other so that they hardly affect the torque detection voltage Vt. However, distortions of structural components such as the core 8 of the torque sensor 1, a slider pin 9, and housing 2, due to thermal expansion, affect the first and second voltages $V_1$, $V_2$ individually, so that the torque detection voltage Vt is changed. Consequently, no accurate torque can be obtained.

Then, the torque sensor 1 of the present invention is provided with a temperature sensor 35. A temperature detecting signal from the temperature sensor 35 is input to the CPU 30.

The CPU 30 corrects a separately-input torque detecting voltage Vt with use of the input temperature detecting signal and detects an accurate steering torque that is not affected by temperature change dependent on other components than the coil itself so as to provide the torque to the driving of a motor 33.

As for correction of a torque detecting voltage Vt, a temperature characteristic of the torque detecting voltage Vt in neutral condition which is not deflected to either right steering torque or left steering torque, that is, a torque detecting voltage Vto, is measured and memorized in the CPU 30.

Figure 4:
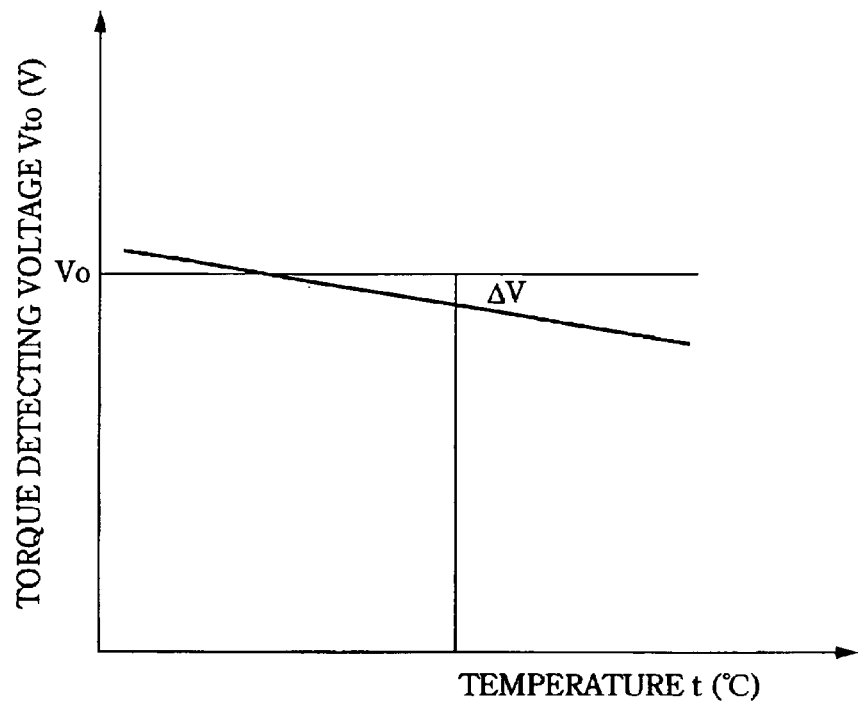
FIG. 4 is a view showing temperature characteristics of a torque detecting voltage in neutral condition.

FIG. 4 shows a temperature characteristic of a torque detecting voltage Vto of a neutral condition.

A normal voltage of a torque detecting voltage Vt in a neutral condition is a bias voltage Vo, which is a constant value. However, the figure shows a temperature-characteristic curved line, (substantially a straight line), which is shifted and inclined due to the temperature.

When the temperature sensor 35 detects a temperature of the torque sensor 1, a voltage difference $\Delta V$ (=Vto-Vo) between the torque detecting voltage Vto at this time and the bias voltage Vo is obtained with reference to the temperature characteristic shown in FIG. 4.

The torque detecting voltage Vt actually detected by the torque detecting circuit 20 is corrected into Vt+$\Delta V$ by adding the voltage difference $\Delta V$ thereto.

This corrected torque detecting voltage Vt+$\Delta V$ is used to detect an actual steering torque based on FIG. 3B.

Up to this point the description was made with the assumption that there was no influence of variations of parts or their assembly. Since variations of parts or their assembly is influential, the temperature characteristic shown in FIG. 4 is actually shifted.

Then, a temperature characteristic of a torque detecting voltage in a neutral condition which is an ideal temperature characteristic of a torque sensor with little mechanical variations and in which a reference neutral point voltage Vo corresponds to a reference temperature Tf is memorized in a memory 31 of the CPU 30.

Figure 5:
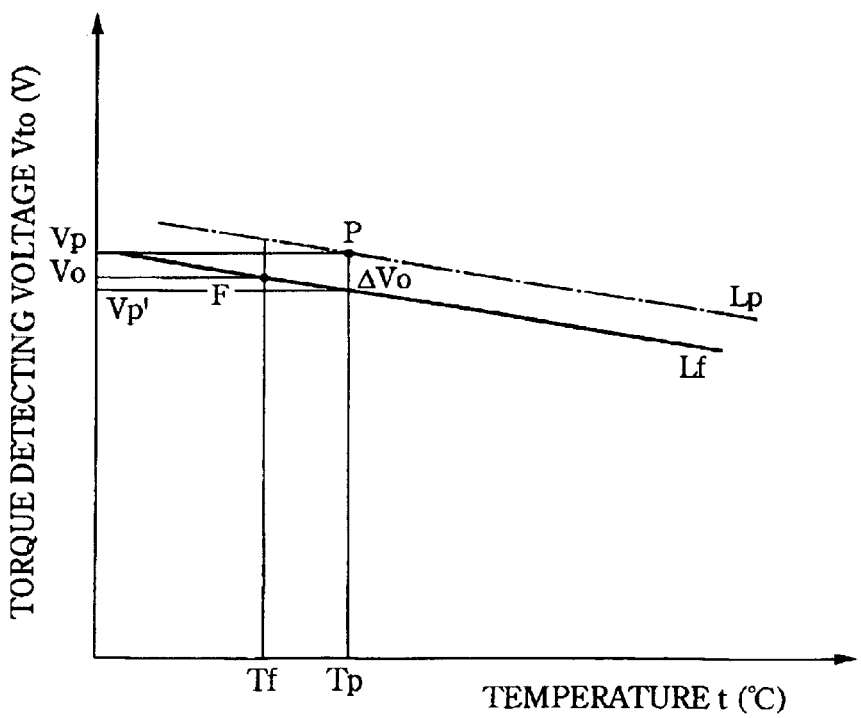
FIG. 5 is a view showing temperature characteristics of a torque detecting voltage in neutral condition for the purpose of explaining a compensation voltage of a neutral point voltage.

The ideal temperature characteristic is shown, with reference to the coordinates of FIG. 5, by an ideal temperature-characteristic straight line Lf having a slope of m and passing a reference coordinate point F (Tf, Vo) indicated by the reference temperature Tf and the neutral point voltage Vo.

The temperature characteristic is shown by an essentially straight line within the temperature range of a usual working environment.

Even if there is an influence of variations of parts or their assembly, the rate of temperature change of a torque detecting voltage of the assembled torque sensor 1, that is, the lean m of the temperature-characteristic straight line on FIG. 5 is hardly changed.

After assembling the torque sensor 1, a torque detecting voltage is measured and at the same time, a temperature of the torque sensor 1 is measured by the temperature sensor 35.

The measured coordinate point P (Tp, Vp) indicated by the measured temperature Tp and torque detecting voltage Vp at this time are shown in FIG. 5.

In other words, the temperature characteristic of the torque detecting voltage of the torque sensor 1 is indicated by a temperature-characteristic straight line Lp having a slope of m and passing at the measured coordinate point P (Tp, Vp), as shown by a dashed line on FIG. 5.

Accordingly, the deviation of the temperature-characteristic curved line Lp from the parallel ideal temperature-characteristic straight line Lf is a regulating voltage $\Delta$Vo of the neutral point voltage, which is obtained to be memorized particularly in an EPPROM of the memory 31.

Then, the torque detecting voltage Vt of the torque detecting circuit 20 is regulated by the regulating voltage $\Delta$Vo so as to convert to an ideal temperature-characteristic straight line Lf which makes it possible to detect an accurate torque with influence of mechanical variations thereon being eliminated.

The above-described procedure of the processing for calculating a neutral point regulating voltage is described according to the flowchart in FIG. 6.

First, a torque detecting voltage is measured and read (Step 1). Filtering processing is performed to remove influence of noise and a measured torque detecting voltage Vp is obtained (Step 2). Then, the temperature sensor 35 is used to detect and read a temperature of the torque sensor (Step 3). Filtering processing is performed to remove the influence of noise and a detected temperature Tp is obtained (Step 4).

Then, in Step 5, it is judged whether or not the measured torque detecting voltage Vp and the detected temperature Tp are both within the regulatable range. When at least one of them is out of the regulatable range, it proceeds to Step 10 to cancel the regulation processing, resulting in the torque sensor being out of order and unusable.

When both the measured torque detecting voltage Vp and the detected temperature Tp are within the regulatable range, it proceeds from Step 5 to Step 6 to read the already memorized ideal temperature characteristic (reference temperature: Tf, neutral point voltage: Vo, the rate of temperature change: m).

Then in Step 7, a torque detecting voltage Vp' which corresponds to the measured temperature Tp on the ideal temperature-characteristic straight line Lf is obtained by calculation of the following equation:

$$Vp'=(Tp-Tf)m+Vo$$

In Step 8, a regulating voltage $\Delta$Vo is obtained from a difference between the calculated torque detecting voltage Vp' and the measured torque detecting voltage Vp, by calculation of the following equation:

$$\Delta Vo=Vp'-Vp$$

The regulating voltage $\Delta$Vo, which is a voltage difference between the calculated torque detecting voltage Vp' corresponding to the measured temperature Tp on the ideal temperature-characteristic straight line Lf and the measured torque detecting voltage Vp, is equal to a voltage difference between a torque detecting voltage and a reference neutral point voltage Vo. This result is obtained on the assumption that they are measured at the reference temperature Tf or to a voltage difference produced by variations of parts and their assembly, and that is, a regulating voltage of the neutral point voltage.

The calculated regulating voltage ΔVo is memorized in the memory (EPPROM) 31 (Step 9).

Then, the torque detecting voltage Vt of the torque detecting circuit 20 is regulated by adding the regulating voltage ΔVo to the torque detecting voltage Vt so as to convert to ideal temperature-characteristic straight line Lf which makes it possible to detect an accurate torque with variations in assembly compensated. Even if there is an error caused by variations of parts or their assembly, this regulating voltage ΔVo is obtained after assembly to be memorized, and then, the regulating voltage ΔVo is used to regulate the detecting voltage Vt, thereby making it possible to detect an accurate torque with no influence caused by mechanical variations.

Calculation of this regulating voltage ΔVo may be carried out conveniently after assembling of the torque sensor 1. Assembly does not have to be performed at a workplace where the temperature is controlled to be a reference temperature as it was, and it is not necessary to measure and regulate a torque detecting voltage at the reference temperature.

According to the present invention, there is disclosed a neutral point voltage regulator of a torque sensor which has a pair of coils having inductances changing in opposite directions based on torques and torque detecting means for outputting a torque detecting voltage based on a voltage difference between a first voltage and a second voltage based on respective inductance changes of the pair of coils. The neutral point voltage regulator comprises ideal temperature-characteristic storing means for storing a temperature characteristic of the torque detecting voltage in a neutral condition. This is an ideal temperature characteristic of which a reference neutral point voltage corresponds to a reference temperature. Also included are temperature detecting means for detecting a temperature of the torque sensor, regulating voltage calculating means for calculating a neutral point regulating voltage based on a measured torque detecting voltage of the torque detecting means measured in neutral condition after assembly of the torque sensor, a detected temperature detected by the temperature detecting means when measuring the torque detecting voltage and the ideal temperature characteristic stored by the ideal temperature-characteristic storing means, and voltage regulating means for regulating the torque detecting voltage of the torque detecting means based on the neutral point regulating voltage calculated by the regulating voltage calculating means.

From the above, since the temperature characteristic of a torque detecting voltage in neutral condition which is an ideal temperature characteristic in which a reference neutral point voltage corresponds to a reference temperature is memorized, if the torque detecting voltage is measured at the same time a temperature of a torque sensor is detected, a neutral point regulating voltage can be calculated by regulating voltage calculating means. Accordingly, it is possible to assemble the torque sensor conveniently without being influenced by the temperature environment, and to measure a torque detecting voltage so as to obtain a regulating voltage. Then, the torque detecting voltage is regulated by the calculated regulating voltage, thereby absorbing any influence due to variations of parts or their assembly.

According to the present invention, there is a neutral point voltage regulator of a torque. The regulating voltage calculating means obtains a calculated torque detecting voltage which corresponds to the detected temperature from the ideal temperature characteristic and calculates a voltage difference between the calculated torque detecting voltage and the measured torque detecting voltage as a neutral point regulating voltage.

The voltage difference between the calculated torque detecting voltage corresponding to the measured temperature on the ideal temperature characteristic and the measured torque detecting voltage is equal to a voltage difference between a torque detecting voltage and reference neutral point voltage. This result is obtained on the assumption that measurement is made at the reference temperature (voltage difference that occurs due to variations of parts or their assembly) and therefore, it is not necessary to measure a torque detecting voltage while maintaining the reference temperature.

The present invention may be utilized in a torque sensor for detecting a right and left steering torque such as in a power steering of a an automobile.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A neutral point voltage regulator of a torque sensor having a pair of coils exhibiting inductances changing in opposite directions based on torques and torque detecting means for outputting a torque detecting voltage based on a voltage difference between a first voltage and a second voltage based on respective inductance changes of the pair of coils, the neutral point voltage regulator comprising:

ideal temperature-characteristic storing means arranged and constructed to store a temperature characteristic of the torque detecting voltage in a neutral condition which is an ideal temperature characteristic of which a reference neutral point voltage corresponds to a reference temperature;

temperature detecting means arranged and constructed to detect a temperature of the torque sensor;

regulating voltage calculating means arranged and constructed to calculate a neutral point regulating voltage based on a measured torque detecting voltage of the torque detecting means measured in neutral condition after assembly of the torque sensor;

a detected temperature detected by the temperature detecting means when measuring the torque detecting voltage and the ideal temperature characteristic stored by the ideal temperature-characteristic storing means; and voltage regulating means arranged and constructed to regulate the torque detecting voltage of the torque detecting means based on the neutral point regulating voltage calculated by the regulating voltage calculating means.

2. The neutral point voltage regulator of a torque sensor according to claim 1, wherein the regulating voltage calculating means obtains a calculated torque detecting voltage which corresponds to the detected temperature from the ideal temperature characteristic and calculates a voltage difference between the calculated torque detecting voltage and the measured torque detecting voltage as a neutral point regulating voltage.

3. The neutral point voltage regulator of a torque sensor according to claim 1, wherein the first voltage and the second voltage are voltages into which an oscillating voltage inputted to a bridge circuit composed of a pair of coils and a pair of resistances is smoothed.

* * * * *